G. S. BANGER & L. D. HURD.
Car-Truck.

No. 201,217.     Patented March 12, 1878.

2 Sheets—Sheet 1.

2 Sheets—Sheet 2.

G. S. BANGER & L. D. HURD.
Car-Truck.

No. 201,217. Patented March 12, 1878.

ated axles, and adapted to turn so as to
UNITED STATES PATENT OFFICE.

GEORGE S. BANGER, OF WILLIAMSPORT, PENNSYLVANIA, AND LORENZO D. HURD, OF WELLSVILLE, NEW YORK, ASSIGNORS TO THEMSELVES AND JAMES DEVLIN, OF WILLIAMSPORT, PENNSYLVANIA.

IMPROVEMENT IN CAR-TRUCKS.

Specification forming part of Letters Patent No. 201,217, dated March 12, 1878; application filed January 3, 1878.

*To all whom it may concern:*

Be it known that we, GEORGE S. BANGER, of Williamsport, in the county of Lycoming and State of Pennsylvania, and LORENZO D. HURD, of Wellsville, in the county of Allegany and State of New York, have invented a new and useful Improvement in Car-Trucks; and we do hereby declare that the following is a full and exact description of the same, reference being had to the accompanying drawings, and to the letters of reference marked thereon.

Our invention relates to that class of car-trucks wherein the wheels are secured to independent axles, and adapted to turn so as to follow the line of a curve, thereby overcoming the friction which results in the ordinary construction from the grinding of the wheels upon the curved track, and also greatly reducing the wear and tear both of the wheels and of the track; and the object of our invention is to produce a truck of this character more especially designed for use upon street-railroads, but also capable of application to passenger and freight railways, which will make this principle of operation practicable by reducing to the minimum the friction of the bearings on which the wheels turn, and by simplifying the construction, so as to make it cheap to manufacture and durable in use.

Our invention therein consists, first, in the means for mounting the wheels in the truck-frame; second, in the devices for turning such wheels; and, further, in the construction of the truck-frame to adapt it for use with the turning wheels, all as fully hereinafter explained.

To enable others skilled in the art to make and use our invention, we proceed to describe the same, having reference to the drawings, in which—

Figure 1:
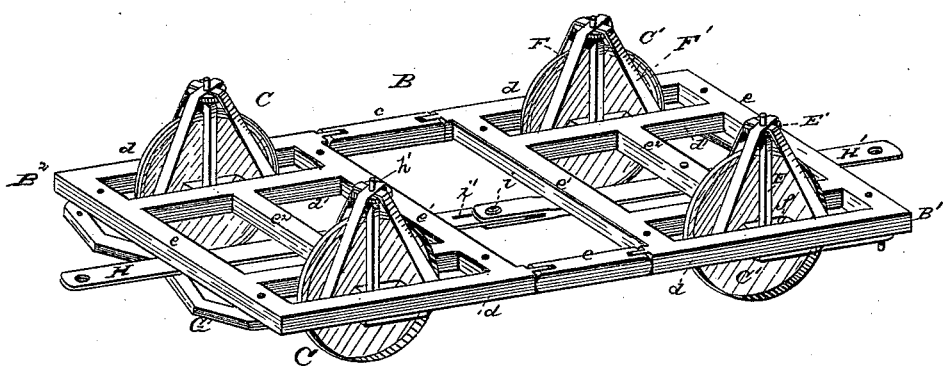
Figure 4:
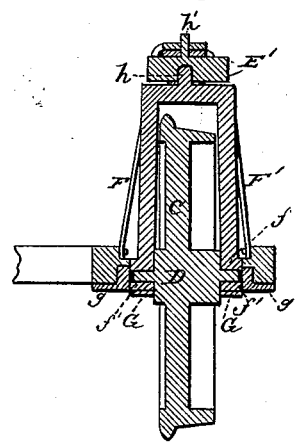
Figure 3:
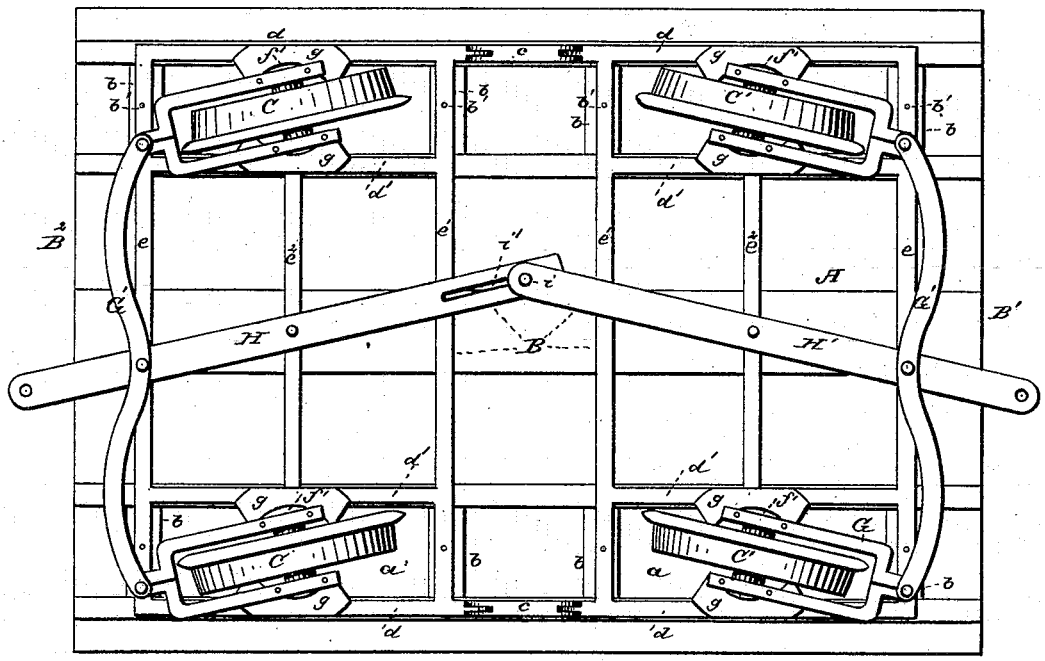
Figure 2:
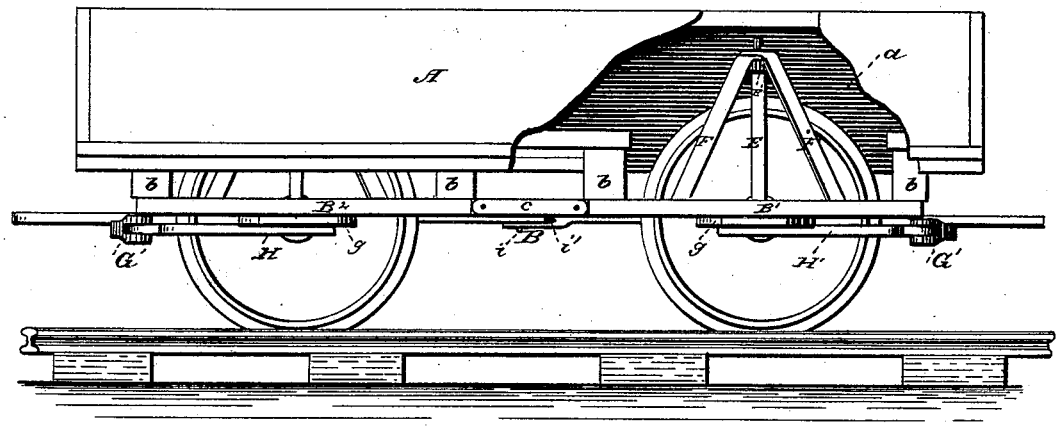

Figure 1 is a perspective view of the truck detached from the body of the car; Fig. 2, a side view of the truck and car-body, with a portion of the body broken away to show the standards and braces for supporting the truck upon the wheels; Fig. 3, a bottom view of the truck and car-body; and Fig. 4, a vertical section through one of the wheels, its journals and bearings, on the line of the axle to the same.

Like letters denote corresponding parts.

A represents a car-body, and B the frame of the truck. The car-body is provided with chambers $a$, into which the wheels project, and at the ends of these chambers are situated the supporting-springs $b$, preferably four in number, which rest directly upon the frame of the truck; and bolts $b'$ may be passed through the truck-frame and springs, and through a portion of the car-body, to hold the parts in position, if found necessary.

The truck-frame B is constructed in two parts, $B^1$ $B^2$, flexibly coupled together by links or bars $c$, which are pivoted to each frame. Each of the frames $B^1$ $B^2$ is composed of two longitudinal bars or beams, $d$ $d'$, on each side thereof, running in the direction of the length of the car-body, each pair of bars $d$ $d'$ being placed just far enough apart to accommodate between them one of the wheels, its axle and bearings. These bars are rigidly connected together at their front and rear ends by cross-bars $e$ $e^1$, and between the inner longitudinal bars $d'$ is placed one or more cross-bars, $e^2$. The springs $b$, before mentioned, rest on the cross-bars $e$ $e^1$, preferably between their junctions with the longitudinal bars $d$ $d'$, and directly to the front and rear of the wheels.

C C' are the front and rear wheels of the truck, supported, respectively, in the two parts $B^1$ $B^2$ of the truck-frame. Each wheel is secured to or cast in one piece with an axle, D, which is made either of wrought or cast iron, and projects only a short distance on each side of the wheel. These axles are journaled at each end in segmental bearing-plates $f$ $f'$, bolted together, and preferably inclosing the entire length of the axles, where they project beyond the hub of the wheels.

These bearing-plates are formed in the shape of a segment of a circle, the rounded portions being farthest from the wheels. The bearing-plates $f$ $f'$ turn in circular bearing-plates $g$, which are rigidly secured to the longitudinal bars $d$ $d'$, and project inwardly from such bars. Each pair of bearing-plates $ff'$ is intended, in practice, to be constructed with a flange (not shown) projecting over the adjoining circular bearing-plate $g$, by which the wheels and their standards are held in place, and prevented from dropping out of the truck-frame, should such frame be raised from the track.

Upon the segmental bearing-plates to each wheel is mounted a vertical forked standard, E, which straddles the wheel, and is secured at its lower ends to the upper plates $f$ of each bearing. On top of each standard is placed a circular bearing-plate, E', and braces F F' pass over these bearing-plates, and are secured to the inner sides of the longitudinal bars $d\ d'$. A pivot, $h$, is secured to the top of each standard E, and has a convex end resting in a socket in the under side of the bearing-plate above it. From each bearing-plate a bolt, $h'$, passes upwardly through the braces, and holds the parts together.

These braces F F' support the truck-frame upon the wheels, and the pivotal bearings of the wheels are on the under side of the plates E', which are directly above the center of the wheels, while the circular bearings in the plates $g$, at the axles, serve to guide the wheels in their turning movement.

To the lower plates $f'$ of each bearing are secured the inner ends of horizontal forked arms G, which inclose the wheels, and extend outwardly on the under side of the truck to the ends of the same.

At each end of the truck-frame is a connecting-bar, G', which is pivoted to the ends of the forked arms G.

H H' are two center bars, which are pivoted to the center of the cross-bars $e^2$ of the truck-frame, and to the center of the connecting-bars G'. The inner ends of these center bars are pivoted together by a bolt, $i$, which is secured to one bar, and works in a slot, $i'$, in the other bar, thus allowing the two parts of the truck to move independently of each other without affecting the operation of the center bars, while the movement of one center bar on its pivot swings the other center bar in the same direction.

To the ends of these center bars are secured the draw-bars, having a suitable elastic connection; and it will be seen that when one of the center bars is drawn on an oblique line, as when the horse turns into a curve, the wheels will be turned to conform to the curve, as shown in Fig. 3.

By having the truck-frame constructed in two parts, joined by flexible connections, the whole running-gear of the car is easily accommodated to any unevenness in the track or road-bed, without causing any strain or twist in any other part of the truck, the two parts of the truck moving vertically, but not laterally, independent of each other. This construction of the track is essential to the successful working of the turning wheels, since the truck-frame has to be so made as not to move independently at opposite ends in a lateral direction; and if constructed rigidly to effect this result, it will be soon so twisted or strained by the unevenness of the track as to become insecure, and will require frequent repair.

By having the pivotal bearing of each wheel directly above it, the wheels can be turned from a straight course with the least possible friction, and the circular bearing-plates at the axles prevent the wheels from turning in or out, and thus hold them at all times perpendicular to the track.

The forked standards connecting the segmental bearing-plates with the pivotal bearings make a very rigid support in connection with the circular bearing-plate and the braces, and are simple in construction.

The arrangement of the center bars, the forked arms, and the connecting-bars, for turning the wheels, is also very effective in operation, and is simple in construction, and not likely to get out of order.

The wheels being mounted on the center of short independent axles, and these axles having an equal bearing upon each side, so that the wheels will turn from points directly over the track, if one wheel should strike an obstruction, it would not be thrown out of line with the track, but would ride over the obstruction, because the force exerted by the stationary obstruction would only throw the segmental bearing-plate with more friction against the curved plates secured to the truck-frame, and this force acts so nearly in line with the center of the axle that it would not have sufficient leverage to turn the wheels; but on street-railroads, if the horse should travel at either side of the track, or move to one side in starting a car, there would be a tendency to turn the wheels and throw the car from the track without some other means were provided than those already described. To meet such a contingency, we have designed to use a spring clutch or bolt, which will catch and hold the center bar firmly, so that it cannot be moved laterally when the car is on a straight track, and can be controlled by the driver, either by pressing on a pin with his foot or by moving a hand-lever, so that the clutch or pin can be disengaged from the center bar when the car approaches a curve.

Having thus fully described our car-truck and explained some of its advantages, what we claim as new, and desire to secure by Letters Patent, is—

1. In a car-truck having turning wheels, the combination, with the truck-frame, provided with a pair of longitudinal bars, $a\ a'$, for supporting the bearing-plates of each axle, of the wheels, each mounted upon a short independent axle between the said longitudinal bars, and segmental plates at each end of the axles moving upon the bearing-plates on the longitudinal bars, whereby the wheels are turned from a central point directly over the track, substantially as and for the purpose set forth.

2. In a car-truck having turning wheels, the combination of the wheels C and the short independent axles D, upon which the wheels are mounted, with the segmental bearing-plates at each end of the axles, and the frame or standard connecting the bearing-plates of each axle, with a pivotal bearing directly above the center of the wheel, substantially as and for the purpose set forth.

3. The combination, with the segmental bearing-plates $f$ and the wheels of the car, of the forked standards E, bearing-plates E', and braces F F', substantially as described and shown.

4. The combination, with the wheels C C' and segmental bearing-plates $f'$, of the forked arms G, connecting-bars G', and center bars H H', substantially as described and shown.

5. The truck-frame B, constructed in two parts, $B^1$ $B^2$, hinged together by rigid links $c$, arranged so that the two parts of the frame can move independently in a vertical direction, but not laterally, substantially as described.

This specification signed and witnessed this 17th day of December, 1877.

GEO. S. BANGER.
L. D. HURD.

Witnesses:
H. HINCKLEY,
G. W. MAYNARD.